2,922,736
METHOD OF CONTROLLING SLIME BY TREATING WITH A 2-ALLYL-CHLOROPHENOL

Donald H. Spalding, Midland, Mich., assignor to The Dow Chemical Company, Midland, Mich., a corporation of Delaware No Drawing. Application December 5, 1956
Serial No. 626,277

9 Claims. (Cl. 162—161)

This invention is concerned with methods and compositions for slime control and is particularly directed to the control of slime in pulp and paper manufacture.

Slime consists of certain microorganisms and accumulations caused by said microorganisms in the presence of organic matter which together form masses and deposits of varying characteristics ranging from stringy, pasty and gelatinous to hard and horny.

The development of slime constitutes a major problem wherever moisture is present and particularly where circulating water systems are involved. The problem of slime control is of considerable importance in the pulp and paper industry where the circulating water systems are particularly adapted to promote slime formation. The water employed in the pulp and paper industry varies from relatively pure spring water to recycled white water or water removed from the stock on the wire. The increased use of the latter in paper manufacture provides favorable conditions for the growth of microorganisms and slime formation since the white water is at a higher temperature and is of greater nutritive value than fresh water. Slime reduces the effective diameter of stock and water lines by sticking to equipment surfaces. Slimy deposits contribute to the plugging of wires and felts on the paper machine, reducing their efficiency and creating problems such as improper sheet formation. The presence of slime in cellulosic pulp fiber affects the strength, appearance and frequently odor of paper made therefrom. Thus, the problems resulting from slime are of concern both from the standpoint of operating costs and the quality of the finished product. As a result, manufacturers of paper and paper products must continually combat slime formation.

Pulp and paper mill slimes are usually bacteria and fungi produced and are caused primarily by species of spore-forming and non-spore-forming bacteria, particularly the capsulated forms which secrete a gelatinous material that surrounds the cells as a capsule or sheath; and fungi, particularly yeasts and molds having filamentous or threadlike structures. Bacterial and fungal organisms of importance in the pulp and paper industry include *Aspergillus flavus, Aspergillus fumigatus, Aspergillus terreus, Pencillium chrysogenum, Trichoderma lignorum, Candida pelliculosa, Saccharomyces cerevisiae, Aerobacter aerogenes, Escherichia coli, Alcaligenes viscosus, Bacillus cereus, Bacillus pumilus* and *Bacillus subtilis* as well as certain others including members of *Flavobacterium, Achromobacter, Torula, Oidium* and *Candida* species. Not all slime-forming organisms are present in every mill or in all sections of a given mill, but a representative number of organisms are present in the pulp and paper mills where slime problems exist. Slimy deposits and gelatinous coatings act to protect the organisms from the adverse effects of heat, dryness and chemicals, making destruction of organisms embedded in slime exceedingly difficult.

The methods of slime control now employed include (1) mechanical and chemical treatment of mill equipment when the mill is not in operation and (2) the addition of slimicides or toxicants to the circulating water system during mill operation. The expression "slimicide" as herein employed refers to toxicants capable of killing and/or inhibiting the growth of slime-producing organisms, thereby preventing the formation of slime. Among the toxicants which have been employed are chlorine, chloramine T, copper sulfate, organo-mercury derivatives, polychlorophenols, quaternary ammonium compounds and combinations of these. The product employed depends considerably on the nature of the slime-producing organisms present in the aqueous system and the effectiveness and the lasting quality of the compounds employed. With certain toxicants, frequent repeated treatment is required because of the fugitive nature of the compound or inactivation thereof by organic matter. With certain others, a multiplicity of treatments or a combination of reagents is necessary because of the assortment of organisms involved, the inactivation of the treating agents by the materials of the furnish and the tendency of some organisms to develop resistant strains. The effectiveness of certain compounds varies with the acidity or alkalinity of the aqueous medium and frequently a concentration which is protective at one pH is totally inadequate at another. The pH range usually encountered in paper manufacture is from 4.5 to 9.5, inclusive.

It is the object of the present invention to provide an improved method and composition for the control of slime-producing organisms. It is further an object to provide a composition and method for the control of slime-producing organisms which is substantially unaffected by varying the pH over a broad range. It is still further an object to inhibit the growth of slime-producing organisms in aqueous cellulosic pulp suspensions. An additional object is to provide a method for the prevention of slime formation in pulp and paper mill water. A still another object is to provide a method for reducing slime and slime producing organisms in paper manufacturing water. Other objects will become apparent from the following specification and claims.

According to the present invention, it has been discovered that effective inhibition of slime formation and growth of slime-producing organisms may be obtained by contacting the slime-producing organisms with an allylchlorophenol compound.

The expression "allylchlorophenol compound" as employed in the present specification and claims refers to (1) a phenol substituted in the benzene nucleus with an allyl radical and with at least two chlorine atoms which are attached at positions meta and para, respectively, to the phenolic hydroxyl and (2) the salt of such phenol. The expression is inclusive of phenols such as 2-allyl-3,4-dichlorophenol and 2-allyl-3,4,6-trichlorophenol and the salts of the phenols such as the sodium, potassium, ammonium, dimethylamine, ethylamine, isopropylamine, tertiary-butylamine, secondary-butylamine, trimethylamine, triethylamine, tributylamine, dodecylamine, dimethyldodecylamine, ethanolamine, triethanolamine, diethanolamine, isopropanolamine, diethanolmonoisopropanolamine, diisopropylamine and piperidine salts. By "allyl group" is meant specifically the radical —CH$_2$CH=CH$_2$.

These allylchlorophenol compounds have been found to have superior slimicidal properties.

In the practice of this invention, slime-producing organisms in systems susceptible to attack by such organisms are contacted with an antimicrobial amount of an allylchlorophenol compound. In the pulp and paper industry, this is conveniently achieved by adding the allylchlorophenol compound to aqueous systems in the pulp and paper mills. Such aqueous system is inclusive of cellulosic pulp suspensions, water employed in the preparation of such pulp suspensions and aqueous paper making medium. Such aqueous systems may be part of the storage or circulating system of the mill. By the expression "aqueous paper making medium" or "aqueous paper manufacturing medium" as herein employed is meant any water or aqueous medium used in the making of paper and is inclusive of fresh water, aqueous medium containing paper making components such as stock or furnish, and water containing a minor portion of fibrous material including white water or reused mill water. The addition may be made at any point in the circulating water system. In the pulp mill, points of addition include (1) to water in the final stage of stock washers, (2) to pulp slurry in storage chests, (3) to pumps or pipe lines delivering white water for dilution and screen showers, and (4) to water at the knotters and other screens. In the paper mill, usual points of addition include (1) to white water at wire screens, fan pumps, etc., (2) to stock moving to the fan pump, and at headboxes, screens or rifflers, (3) to stock and/or broke at beaters and (4) to pumps or pipe lines delivering water to Bird screens and headbox showers or wire screening showers. In an alternative procedure, the organisms and pulp and paper mill equipment may be contacted with an allyl chlorophenol compound during suspension of operation by spraying or washing storage chests and equipment with the toxicant composition.

The method of the present invention may be carried out with an unmodified allylchlorophenol compound or with a modified composition in the form of liquid, paste, powder or briquette. Good control of slime organisms is obtained when the ultimate aqueous composition contains at least 0.001 percent by weight of the allylchlorophenol compound. Modified compositions may contain one or more additaments including dispersing and solubilizing agents, stabilizers, binders, finely divided solids, and solvents or other liquid carriers. Depending on the concentration of the allylchlorophenol compound and the particular way in which the treatment is carried out, such compositions may be employed directly or be considered concentrate compositions and further diluted to produce the treating composition. In the modified compositions, the allylchlorophenol compound may be present in an amount of as much as 98 percent by weight, although compositions containing from 30 to 75 percent by weight of the allychlorophenol compound are generally preferred. Such compositions, when solid or semi-solid such as powders, briquettes or pastes, usually contain in addition to the phenolic compound, a dispersing agent in an amount of from about 0.5 to 20 percent by weight of the composition. They may in addition be further modified by one or more of stabilizers, binders, inert powders and moistening agents. When the modified composition is a liquid, suitable liquid carriers include organic solvents such as acetone and alcohols, and water. These compositions may contain in addition a minor proportion of emulsifying agent, dispersing agent or additional solubilizing agent in an amount of from 0.5 to 10 percent by weight of the composition. Suitable surface active dispersing and solubilizing agents for use in augmented compositions include the alkyl aryl sulfonates, sulfate and sulfonate fatty acid amides, polymerized sodium salts of alkyl naphthalene and benzene sulfonic acids and ammonium salt or monoethylphenyl phenol sulfonate, sodium and potassium salts of sulfonated esters of dicarboxylic acids and sulfated fatty esters.

The allylchlorophenol compound may be employed in any amount adapted to inhibit the growth of microorganisms and formation of slime. The optimum concentration will vary with the microbial flora present in the system or the particular part of the system infected, the method of application of inhibitor, the nature of stock, the nature and amount of other additaments present. For example, where groundwood pulp, broke or old stock is used or where sizing is added to the furnish, a more rigorous treatment is usually called for. Together with such factors are to be considered the method and frequency of treatment. Pulp and paper mills may be treated for slime control during mill operation or during suspension of operation. During mill operation, the treatment may be carried out by adding the toxicant (1) intermittently in "slug doses" or (2) continuously in inhibitory amounts. Higher concentrations are used when the intermittent dosing method is employed. Further, an initial "slug dose" may be followed by a lower maintenance dose. When the toxicant is employed for continuous inhibitory treatment, an amount to give 10 to 50 parts by weight per million parts by weight of aqueous medium or paper making water is considered desirable. In some instances it is possible to employ as little as 5 parts by weight of the allylchlorophenol compound to obtain an inhibiting effect. For a slug type intermittent treatment, an amount to give a concentration of at least 50 parts by weight per million is considered desirable. The upper limit is dictated primarily by economic considerations. Generally, a range of from 50 to 500 parts by weight per million parts by weight of aqueous medium is considered adequate.

When the toxicant is applied to the mill equipment during mill shut-down and clean-up, or just prior to shut-down, relatively high concentrations of the slimicide are employed. This is accomplished most frequently by spraying equipment with a toxicant composition usually after preliminary cleaning. Such spray compositions generally contain from 0.5 to 10 percent of the allylchorophenol compound in aqueous dispersion, although a concentrate composition containing as much as 60 percent of the phenolic compound is sometimes employed. Alternatively, a detergent-toxicant composition, with or without heat, may be contacted with mill equipment.

The following examples illustrate the invention but are not to be construed as limiting:

EXAMPLE 1

A mixed inoculum was prepared by washing off the surface of week-old slants of pure cultures of each of the following slime-producing organisms: *Aspergillus flavus, Aspergillus fumigatus, Aspergillus terreus, Penicillium chrysogenum, Trichoderma lignorum, Candida pelliculosa, Saccharomyces cerevisiae, Aerobacter aerogenes, Escherichia coli, Alcaligenes viscosus, Bacillus cereus, Bacillus pumilus* and *Bacillus subtilis*, with 5 milliliter portions of sterile distilled water and combining the washings.

25 milliliter portions of a 0.5 percent by weight groundwood pulp suspension buffered to a pH of 5 with a citric acid-disodium phosphate buffer was inoculated with 0.5 milliliter of the inoculum prepared above and incubated at 30° C. for 3 days. Thereafter, 2-allyl-3,4-dichlorophenol was added as a 0.5 percent solution in 50 percent (by volume) aqueous acetone to the inoculated pulp suspensions to give the desired concentrations of the allylchlorophenol compound therein. The resulting treated suspensions were thereafter incubated at 30° C. for 48 hours. After incubation, duplicate subcultures were made by transferring an aliquot from the pulp suspensions into a brain-heart infusion broth and the subcultures incubated for 24 hours at 30° C. Following the incubation period, the subcultures were examined for evidence of microbial growth. The results obtained together with the concentration at which the 2-allyl-3,4-dichlorophenol compound was employed are set forth in the following table:

Table I

| Concentration of 2-Allyl-3,4-Dichlorophenol in Parts by Weight Per Million Parts by Weight of Pulp Suspension | Microbial Growth | |
|---|---|---|
| | Subculture 1 | Subculture 2 |
| 300 | None | None |
| 250 | ---do--- | Do. |
| 200 | ---do--- | Do. |
| 150 | ---do--- | Do. |

In a check operation carried out in a similar manner but wherein no 2-allyl-3,4-dichlorophenol is added to the groundwood pulp suspensions, prolific growth of microorganisms is observed in the subcultures.

EXAMPLE 2

In an operation carried out in a manner similar to that described in Example 1 but wherein the compound employed was 2-allyl-3,4,6-trichlorophenol, the following results were obtained:

Table II

| Concentration of 2-Allyl-3,4,6-Trichlorophenol in Parts by Weight Per Million Parts of Pulp Suspension | Microbial Growth | |
|---|---|---|
| | Subculture 1 | Subculture 2 |
| 400 | None | None |
| 300 | ---do--- | Do. |
| 250 | ---do--- | Do. |
| 200 | Slight | Do. |

In check operations wherein no 2-allyl-3,4,6-trichlorophenol is added, prolific growth of microorganisms is observed in subcultures.

EXAMPLE 3

Further operations were carried out as described in Example 1 except that the pulp suspensions were buffered to a pH of 8 with a citric acid-disodium phosphate buffer. The results obtained are given in Table III.

Table III

| Compound | Concentration of Allylchlorophenol Compound in Parts by Weight Per Million Parts of Pulp Suspension | Microbial Growth | |
|---|---|---|---|
| | | Subculture 1 | Subculture 2 |
| 2-Allyl-3,4-dichlorophenol | 400 | None | None |
| | 300 | ---do--- | Do. |
| | 200 | Yes | Do. |
| 2-Allyl-3,4,6-trichlorophenol | 400 | None | Do. |
| | 300 | ---do--- | Do. |
| | 200 | ---do--- | Do. |

Subcultures from checks containing no allylchlorophenol compound show prolific microbial growth.

EXAMPLE 4

25 milliliter portions of an unbuffered groundwood pulp suspension are inoculated with 0.5 milliliter portions of an inoculum prepared as described in Example 1 and the suspensions incubated at 30° C. for 3 days. Thereafter, various allylchlorophenol compounds are added to the suspensions, and the treated suspensions incubated and thereafter subcultured as described in Example 1. Following the incubation period, the subcultures are examined and the following results observed.

Subcultures from checks containing no allylchlorophenol compound show prolific microbial growth.

Table IV

| Allylchlorophenol Compound | Concentration of Allylchlorophenol Compound in Parts by Weight Per Million Parts of Pulp Suspension | Microbial Growth | |
|---|---|---|---|
| | | Subculture 1 | Subculture 2 |
| 2-Allyl-3,4,6-trichlorophenol, sodium salt | 250 | None | None. |
| 2-Allyl-3,4,6-trichlorophenol, triethylamine salt | 350 | ---do--- | Do. |
| 2-Allyl-3,4,6-trichlorophenol, methylamine salt | 300 | ---do--- | Do. |
| 2-Allyl-3,4,6-trichlorophenol, ethanolamine salt | 200 | ---do--- | Do. |
| 2-Allyl-3,4-dichlorophenol, triethanolamine salt | 175 | ---do--- | Do. |
| 2-Allyl-3,4-dichlorophenol, potassium salt | 225 | ---do--- | Do. |
| 2-Allyl-3,4-dichlorophenol, diethylamine salt | 275 | ---do--- | Do. |
| 2-Allyl-3,4-dichlorophenol, isopropylamine salt | 300 | ---do--- | Do. |

EXAMPLE 5

Water-acetone solutions of 2-allyl-3,4,6-trichlorophenol are dispersed in 100 milliliter samples of white water to give the desired concentration of the 2-allyl-3,4,6-trichlorophenol therein. The white water has a pH of 6.5 and is obtained from the settling tanks of a groundwood-sulfite mill producing book paper. The water-acetone solutions are prepared in such a way that no less than 0.5 milliliter nor more than 4.0 milliliters are required to obtain the desired concentration of toxicant in the white water. The resulting white water is then allowed to stand for 48 hours at 30° C. At the end of this period, equal aliquot portions of the treated samples are plated on tryptone glucose extract agar and the plates incubated for 48 hours at 30° C. A check operation is carried out wherein untreated white water is incubated and an exactly equal aliquot plated in a similar manner to that previously described.

Following the incubation period, the plates are examined and bacterial counts made in order to determine the percentage reduction in bacterial count during contact period based on the count of checks. The results obtained are as follows:

Table V

| Concentration of 2-Allyl-3,4,6-Trichlorophenol in Parts by Weight Per Million Parts by Weight of White Water | Bacterial Count (Number per Milliliter) | Percent Reduction |
|---|---|---|
| 25 | 24,000,000 | 70 |
| 100 | 16,000,000 | 80 |
| 200 | 8,000,000 | 90 |
| 300 | 1,600,000 | 98 |

At the time of the observations, the checks showed 80,000,000 bacteria per milliliter of untreated white water.

EXAMPLE 6

In an experiment carried out in a manner similar to that described in Example 5 but wherein the contact time of the toxicant with the white water is 24 hours, a 50 percent reduction in bacterial count (based upon the bacterial count of the untreated white water) is obtained when the concentration of 2-allyl-3,4,6-trichlorophenol in the white water is 10 parts per million. A substantially complete reduction is obtained when the concentration of the phenol is 300 parts per million. The untreated white water employed in these operations has a bacterial count of 125,000,000 bacteria per milliliter.

EXAMPLE 7

An experiment is carried out in a manner similar to that described in Example 5, but employing white water from a groundwood mill having an initial pH of 5.7.

2-allyl-3,4,6-trichlorophenol is added to give a concentration of 100 parts per million and allowed to stand in contact with white water for three hours. Subsequent bacterial count shows a 98 percent reduction from that of the check which contains 15,000,000 bacteria per milliliter.

EXAMPLE 8

Briquettes containing 50 percent by weight of sodium 2-allyl-3,4-dichlorophenoxide and 50 percent by weight of adjuvants including alkali detergents and binders are immersed in the white water passing from the wire trays in the paper making machine of a mill making book paper. The resulting white water contains 100 parts per million of sodium 2-allyl-3,4-dichlorophenoxide. The water is cycled through the white water system of the paper mill and is found to be substantially free of slime organisms.

EXAMPLE 9

An equeous dispersion comprising 2-allyl-3,4,6-trichlorophenol and a surface active dispersing agent is prepared by adding a 60 percent liquid concentrate of 2-allyl-3,4,6-trichlorophenol and an ammonium salt of monoethyl phenyl phenol sulfonate to water. The resulting composition containing 10 percent by weight of the phenol is added to the furnish at the beaters in a paperboard mill to give a concentration of the phenol in the furnish of 200 parts by weight per million parts of aqueous dispersion. After continuous treatment for several days, the resulting furnish when passed through to the headbox chest of the paperboard machine is substantially free of slime.

EXAMPLE 10

A paper making machine suspended from operation is washed with detergent and sprayed with a spray composition comprising a 30 percent aqueous dispersion of potassium 2-allyl-3,4-dichlorophenoxide. The machine is freed of slime-producing organisms.

EXAMPLE 11

A 50 percent alcohol solution of 2-allyl-3,4,6-trichlorophenol is added in sufficient quantity to the white water prior to mill shut-down to give a concentration therein of 400 parts by weight per million parts by weight of white water. The resulting white water is circulated throughout the system to contact the slime-producing organisms.

EXAMPLE 12

A solid composition containing 2 percent sodium alkyl naphthalene sulfonate as dispersing agent and 98 percent by weight of 2-allyl-3,4,6-trichlorophenol is dispersed in water to prepare a concentrated aqueous dispersion containing 50 percent by weight of the phenolic compound. The resulting aqueous dispersion is added to a pulp slurry subsequent to the final washing step in a kraft mill. The concentration of the phenolic compound in the resulting pulp slurry is 200 parts by weight per million parts of aqueous slurry. The treatment maintains the slurry free of slime organisms during storage in a stock chest prior to use in paper manufacture.

EXAMPLE 13

A concentrated aqueous solution of sodium 2-allyl-3,4-dichlorophenoxide is added to the white water during the final screening step in a groundwood pulp mill to give a concentration therein of 500 parts by weight per million parts of the water. The toxicant contacts and inhibits the growth of slime organisms present in the white water and the pulp slurry formed therewith.

The allylchlorophenols of this invention may be prepared by heating the allyl ether of the appropriate chlorophenol at the boiling point according to the general procedure for "Claisen Rearrangement" as described in Organic Reactions, volume II, page 1, John Wiley and Sons, Inc. (1944).

I claim:

1. A method for preventing the deposition and growth of slime-forming bacteria and fungi which comprises contacting said organisms with an antimicrobial amount of a slimicide comprising a compound selected from the group consisting of 2-allyl-3,4-dichlorophenol, 2-allyl-3,4,6-trichlorophenol and their salts.

2. A method for inhibiting the formation of slime and the growth of slime-producing organisms which comprises adding an allylchlorophenol compound to aqueous paper making medium in an amount to give a concentration therein of from 10 to 50 parts by weight per million parts of said medium, said allylchlorophenol compound being selected from the group consisting of 2-allyl-3,4-dichlorophenol, 2-allyl-3,4,6-trichlorophenol and their salts.

3. A method for reducing slime and slime-producing organisms in aqueous paper making medium which comprises adding to aqueous paper making medium an allylchlorophenol compound in an amount to give a concentration therein of from 50 to 500 parts by weight per million parts of said medium, said allylchlorophenol compound being selected from the group consisting of 2-allyl-3,4-dichlorophenol, 2-allyl-3,4,6-trichlorophenol and their salts.

4. A slimicidal composition comprising an allylchlorophenol compound in intimate admixture with dispersing agent wherein the dispersing agent is employed in an amount of from 0.5 to 20 percent by weight of the composition, said allylchlorophenol compound being selected from the group consisting of 2-allyl-3,4-dichlorophenol, 2-allyl-3,4,6-trichlorophenol and their salts.

5. A method for inhibiting the growth of slime in aqueous cellulosic pulp suspension which comprises adding thereto an antimicrobial amount of an allylchlorophenol compound, said allylchlorophenol compound being selected from the group consisting of 2-allyl-3,4-dichlorophenol, 2-allyl-3,4,6-trichlorophenol and their salts.

6. A method according to claim 5, wherein the allylchlorophenol compound is added in an amount to give a concentration therein of at least 10 parts per million parts of aqueous cellulosic pulp suspension.

7. A method according to claim 6, wherein the aqueous cellulosic pulp suspension is in the pH range of from 4.5 to 9.5, inclusive.

8. In the process of pulp and paper manufacture, a method for inhibiting the formation of bacteria and fungi induced slime which comprises adding to the aqueous systems of the mill an antimicrobial amount of an allylchlorophenol compound, said allylchlorophenol compound being selected from the group consisting of 2-allyl-3,4-dichlorophenol, 2-allyl-3,4,6-trichlorophenol and their salts.

9. A method for preventing deposition and growth of slime and slime-producing organisms in pulp and paper manufacturing equipment with a composition comprising at least 0.5 percent of an allylchlorophenol compound, said allylchlorophenol compound being selected from the group consisting of 2-allyl-3,4-dichlorophenol, 2-allyl-3,4,6-trichlorophenol and their salts.

References Cited in the file of this patent

UNITED STATES PATENTS

| | | |
|---|---|---|
| 2,002,447 | Deichsel | May 21, 1935 |
| 2,400,677 | Allen | May 21, 1946 |

OTHER REFERENCES

Chem. Abst., vol. 49, Apr.-May 1955, p. 6868e.
Chem. Abst., vol. 8, Jan.-May 1914, p. 65.